United States Patent [19]

Maehara

[11] Patent Number: 5,080,449
[45] Date of Patent: Jan. 14, 1992

[54] HYDRAULIC BRAKE PRESSURE CONTROLLING APPARATUS FOR A VEHICLE

[75] Inventor: Toshifumi Maehara, Saitama, Japan

[73] Assignees: Akebono Brake Industry Co. Ltd., Tokyo; Akebono Research and Development Centre Ltd., Saitama, both of Japan

[21] Appl. No.: 487,058

[22] Filed: Mar. 2, 1990

[30] Foreign Application Priority Data

Mar. 8, 1989 [JP] Japan .................................. 1-53930
Mar. 29, 1989 [JP] Japan .................................. 1-74880
Apr. 5, 1989 [JP] Japan .................................. 1-84644
Apr. 5, 1989 [JP] Japan .................................. 1-84645

[51] Int. Cl.⁵ .............................................. B60T 8/32
[52] U.S. Cl. ............................ 303/113 TR; 818/345; 303/52; 303/116 R; 303/119 R
[58] Field of Search ................. 303/113, 114, 110, 92, 303/116, 119, 100, 50-56, 68, 113 TB, 113 R, 113 TR, 114 R, 116 R, 119 R; 188/345; 60/547.1

[56] References Cited

U.S. PATENT DOCUMENTS 4,415,210 11/1983 Belart et al. .
4,867,509 9/1989 Maehara et al. ............. 303/110 X
4,869,560 9/1989 Nishii ............................. 303/114
4,952,003 8/1990 Okubo ........................ 303/114 X Primary Examiner—Douglas C. Butler
Attorney, Agent, or Firm—Finnegan, Henderson, Farabow, Garrett and Dunner

[57] ABSTRACT

A hydraulic brake pressure control apparatus in which a relief valve is disposed in a fluid passage communicating a fluid pressure chamber of a master cylinder with an ejection end of a fluid pump for discharging a brake fluid to a reservoir when the brake fluid pressure in the fluid passage exceeds a predetermined value and the relief valve opens. An abutting direction of a valve member of the relief valve against a valve seat is the same as a discharging direction of the brake fluid during the opening operation of the relief valve.

16 Claims, 13 Drawing Sheets

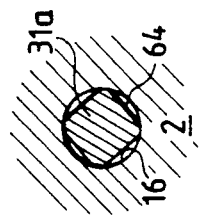
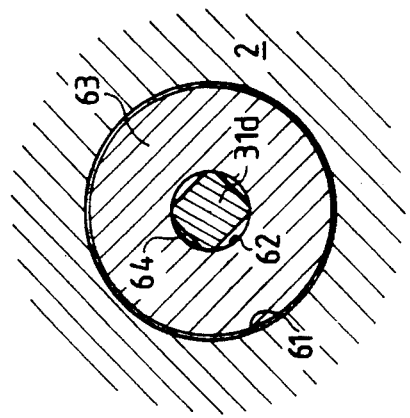
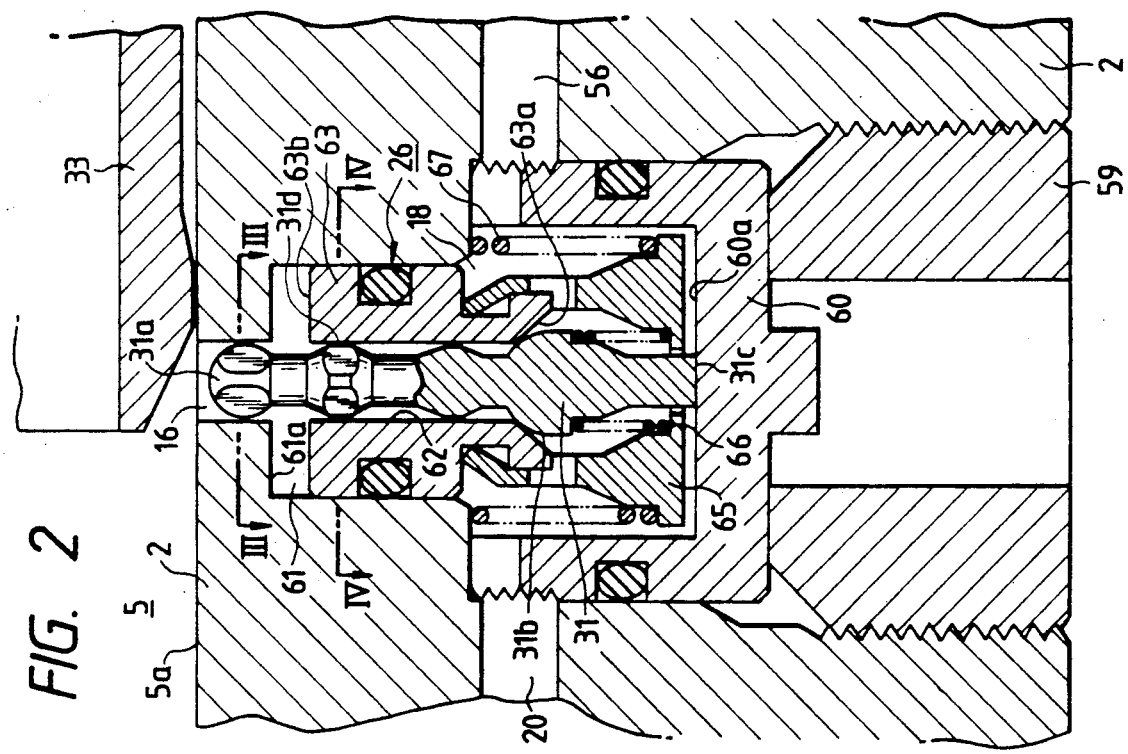

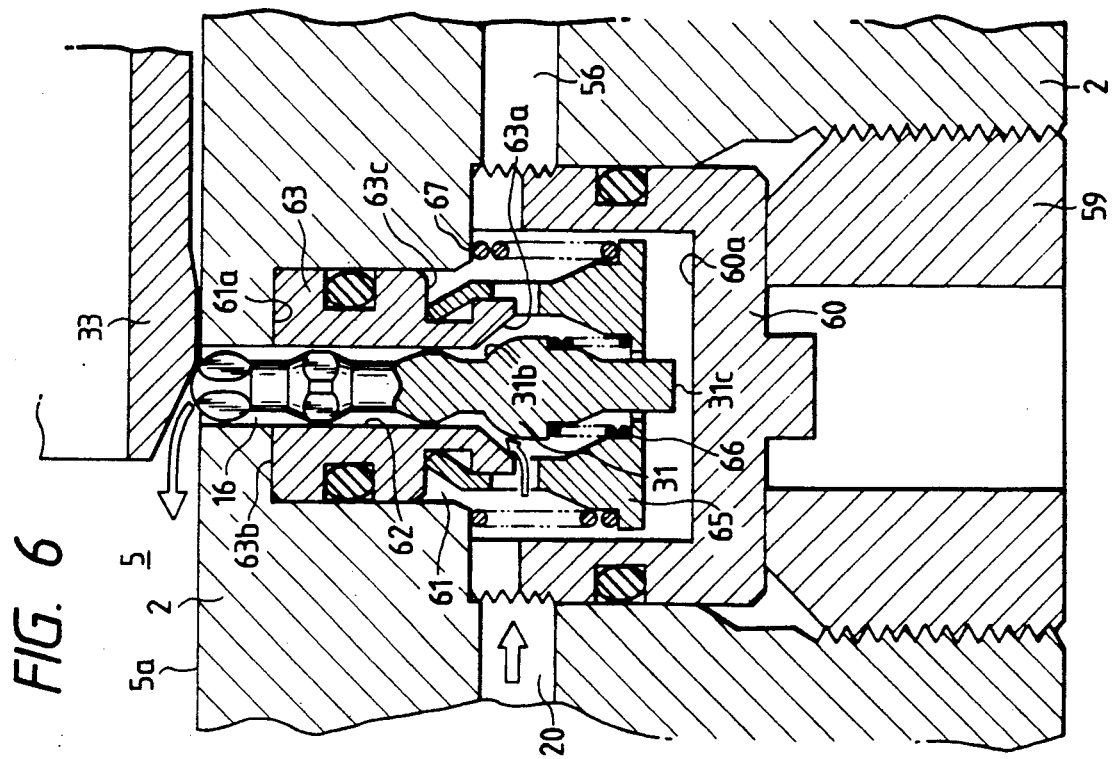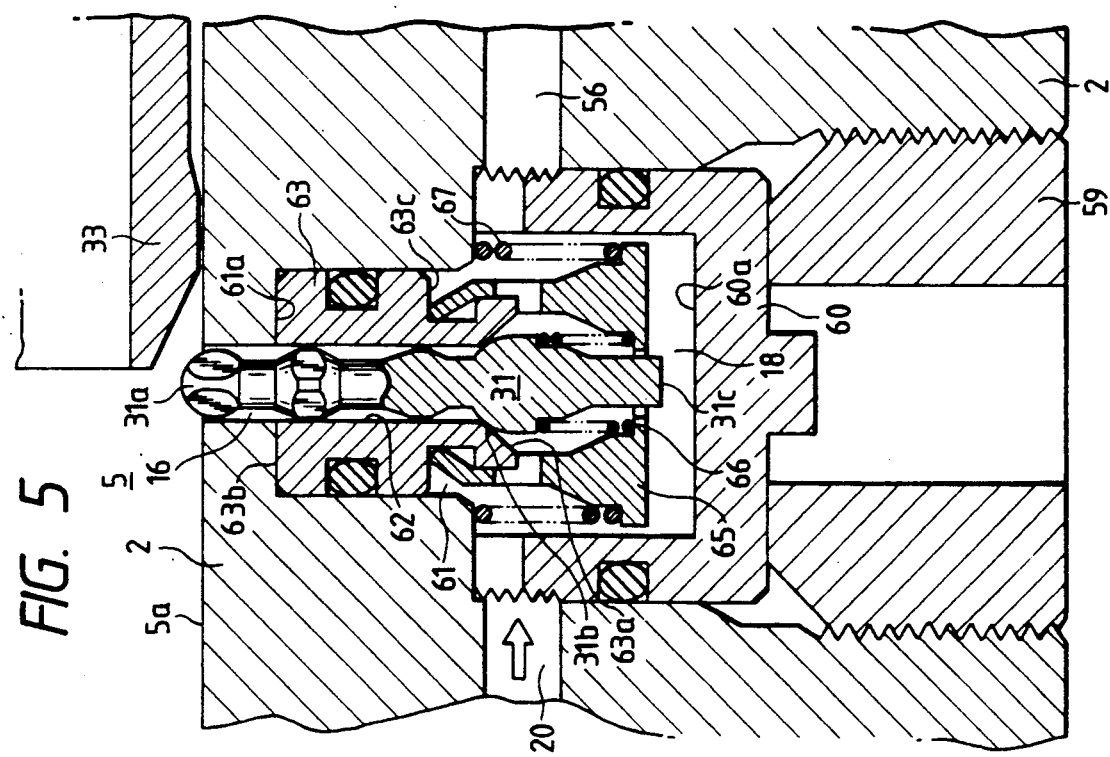

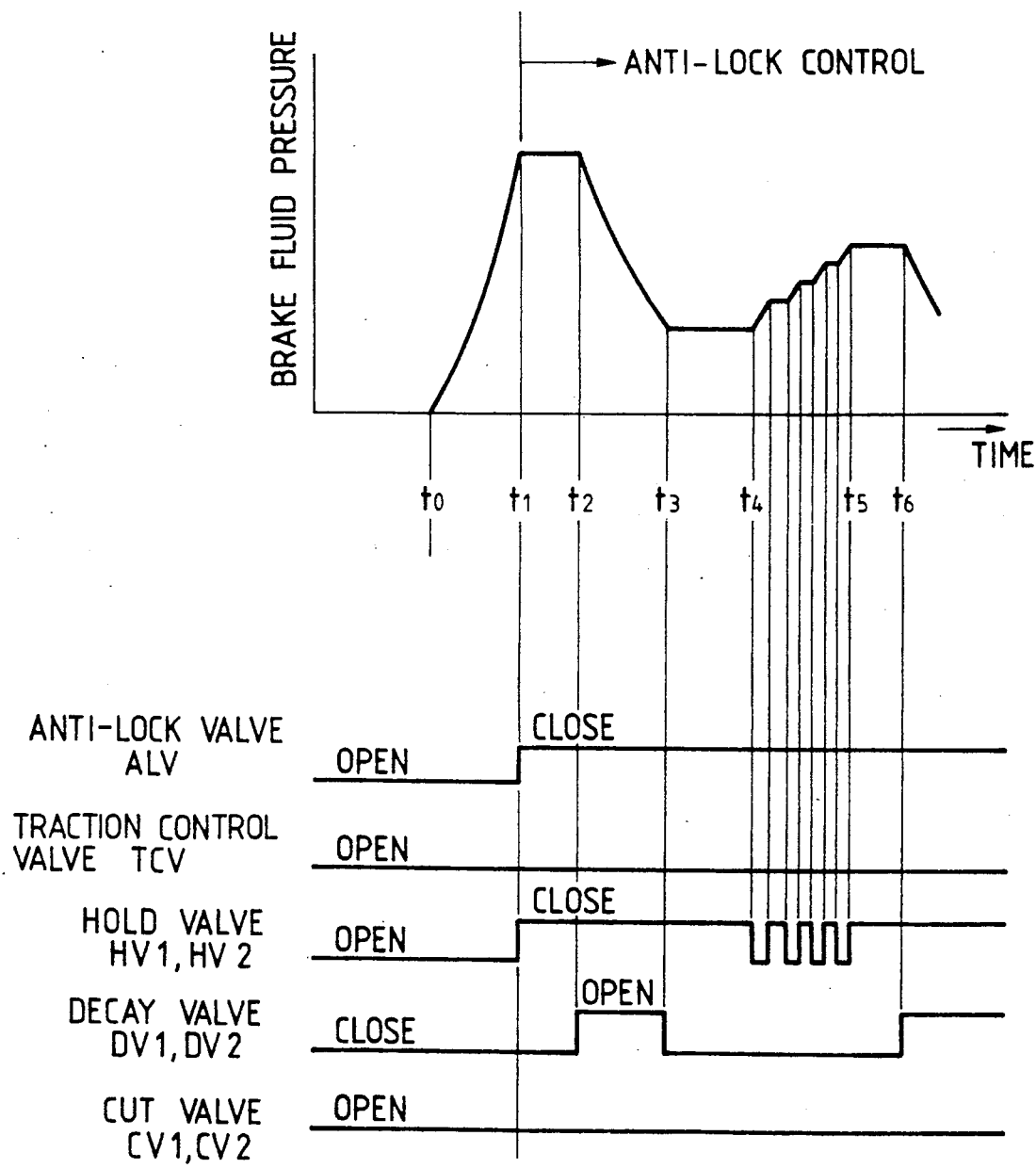

HYDRAULIC BRAKE PRESSURE CONTROLLING APPARATUS FOR A VEHICLE

BACKGROUND OF THE INVENTION

1. Field of the Invention

The present invention relates to a hydraulic brake pressure controlling apparatus for a vehicle, which is employed during an anti-lock control operation preventing a lock of vehicle wheels when the vehicle brakes, or during a traction control operation preventing a slippage of driving wheels of the vehicle when the vehicle starts to move and/or accelerates.

2. Description of the Related Art

A known anti-lock control apparatus is intended for preventing the vehicle wheels from locking when the vehicle brakes and for achieving a running stability and shortening the brake distance. In the anti-lock control apparatus, it is provided a microcomputer which determine a control mode (pressure increasing mode, pressure decreasing mode and holding mode) of the brake fluid pressure in accordance with a signal representing a speed of the vehicle wheel detected by a vehicle wheel speed sensor, and increasing, holding or holding the brake fluid pressure by opening or closing hold valves (pressure increasing and holding valve) and decay valves (pressure decreasing valve) formed of a solenoid valve, corresponding to one of the control modes.

There has been known a conventional hydraulic brake pressure controlling apparatus in which a fluid pressure control member (modulator) for the anti-lock control operation described above is provided together as one unit with a master cylinder. In such an apparatus, as disclosed in U.S. Pat. No. 4,415,210, for example, a master cylinder is provided with a primary piston and secondary piston arranged in series with each other to form a tandem type. These pistons control fluid pressure of two brake device systems, respectively. In the apparatus, further, hold valves of normally-open type are disposed in fluid passages communicating between two fluid pressure chambers actually controlled by the primary and secondary pistons and respective wheel cylinders, and decay valves of normally-closed type are disposed in a passage communicating between the wheel cylinders and a reservoir.

When a brake pedal is depressed down to thereby supply the fluid pressure in the fluid pressure chamber of the master cylinder to the wheel cylinders through hold valves and, accordingly, the fluid pressure in the wheel cylinder increases to apply a braking force to the vehicle wheels. After that, when the anti-lock control operation starts, the hold valves close to hold the brake fluid pressure. In this condition, when the decay valves open while closing the hold valves, the brake fluid in the wheel cylinders is discharged to the reservoir through the decay valves, so that the fluid pressure in the wheel cylinder is decreased to thereby decreasing the braking force. On the other hand, during the pressure increasing mode in the anti-lock control operation, the hold valves open while the highly-pressurized brake fluid supplied from the fluid pressure source such as an accumulator is applied to the pistons, to thereby increase the fluid pressure in the wheel cylinders.

However, if in the case that the fluid pressure source system such as a fluid pump or the like is failed during the anti-lock control operation, since the braking force decreases, the brake pedal must be depressed down more strongly. Such is disadvantageous in that it is difficult to maintain the sufficient remained stroke of the brake pedal.

In view of the foregoing difficulty accompanying the conventional apparatus, the present inventor has proposed, as disclosed in commonly assigned U.S. Pat. No. 4,867,509, an improved hydraulic brake pressure controlling apparatus capable of eliminating the difficulty. In this apparatus, it is provided a fluid passage communicating the fluid pressure chamber of the master cylinder with an accumulator, and in the fluid passage a supply valve of normally-closed type which opens merely during the anti-lock control operation. The apparatus is further provided with intake valves in opening parts of the fluid passage which parts communicating with the fluid pressure chamber, so that head part of the intake valves are protrudable into the fluid pressure chamber thereby shutting the fluid passage. Furthermore, the apparatus is provided with valve operating members movable together with the pistons of the master cylinder for opening the intake valves in such a manner that the valve operating members engage with end portions of the intake valve when the stroke of the piston reaches a predetermined amount.

In the hydraulic brake pressure control apparatus, since the valve operating members open the intake valves in accordance with the movement of the pistons of the master cylinder, during the anti-lock or traction control operations in which the supply valve opens, the highly pressurized brake fluid is supplied from the accumulator into the fluid pressure chamber of the master cylinder, so that the piston is pushed back to a predetermined position, thereby maintaining a sufficient stroke of the brake pedal in case of failing the fluid pressure source system and, therefore, a required braking force in proportion to the depressing force applied to the brake pedal can be supplied to the wheel cylinders to brake the vehicle.

However, such an apparatus is still disadvantageous in that the apparatus requires the accumulator having a large capacity and a pressure switch for supervising the fluid pressure in view of the fail-safe, which cause the apparatus to be large in size, heavy in weight, and high in manufacturing cost.

SUMMARY OF THE INVENTION

It is, therefore, an object of the present invention to provide a hydraulic brake pressure control apparatus small in size, light in weight, and low in manufacturing cost without requiring an accumulator.

The above and other objects of the invention can be achieved by a provision of a hydraulic brake pressure control apparatus in which, according to the invention, a relief valve is disposed in a fluid passage communicating a fluid pressure chamber of a master cylinder with an exhausting end of a fluid pump for discharging a brake fluid to a reservoir when the brake fluid pressure in the fluid passage exceeds a predetermined value and the relief valve opens. An abutting direction of a valve member of the relief valve against a valve seat is the same as a discharging direction of the brake fluid during the opening operation of the relief valve.

Other objects and features of the present invention will become apparent from the following detailed description considered in connection with the accompanying drawings. It is to be understood, however, that the drawings are designed as an illustration only and not as a definition of the limits of the invention.

BRIEF DESCRIPTION OF THE DRAWINGS

FIG. 2 is an enlarged sectional view showing a valve mechanism of the apparatus, shown in FIG. 1;

FIGS. 3 and 4 show an intake valve cut in a line III and a line IV, respectively, in FIG. 2;

FIGS. 5 and 6 are sectional views showing an operation of the valve mechanism shown in FIG. 2;

FIG. 7 is a timing chart explaining the anti-lock control operation of the apparatus shown in FIG. 1;

DESCRIPTION OF THE PREFERRED EMBODIMENTS

Figure 1:
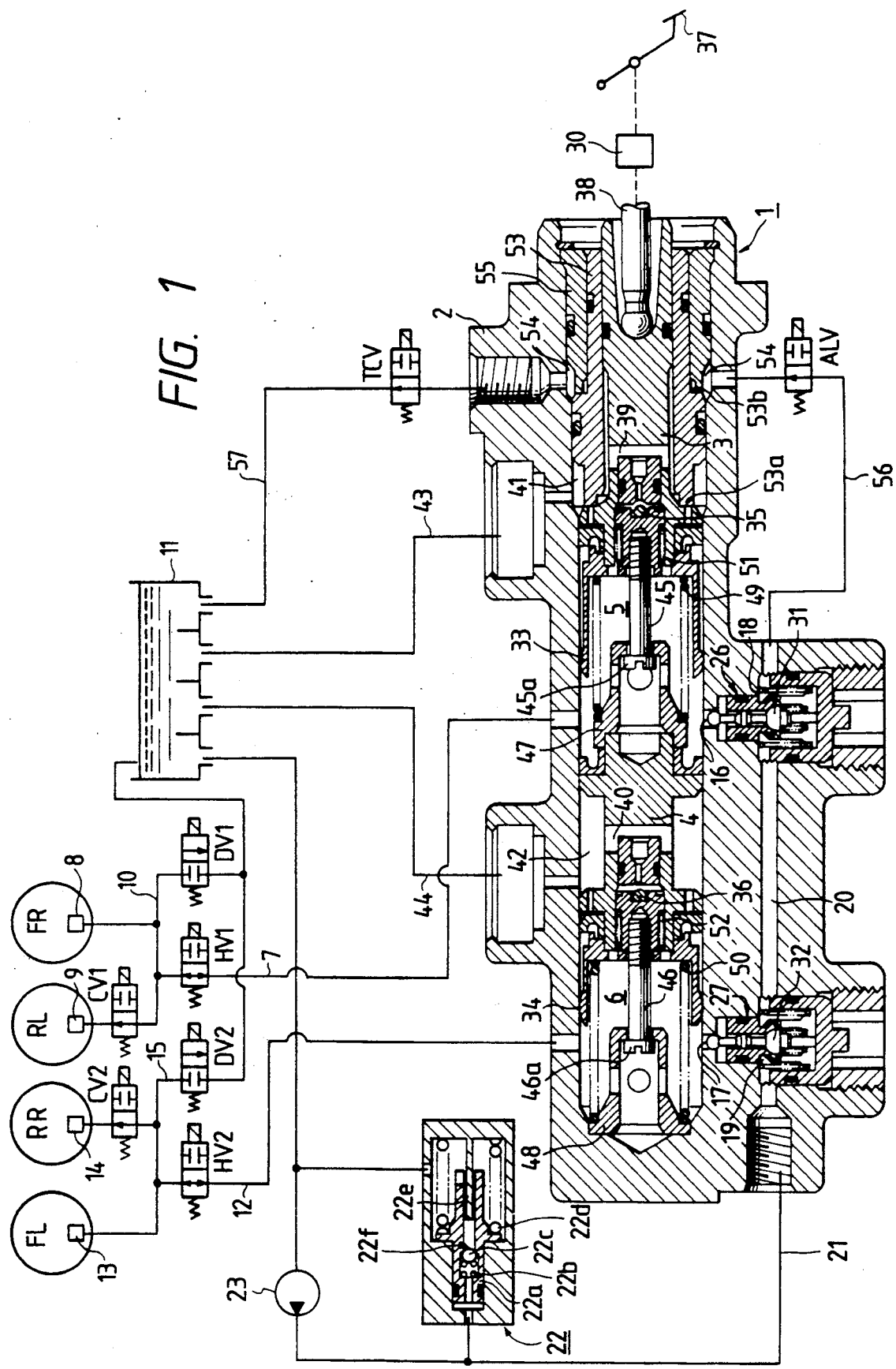
FIG. 1 is a sectional view showing a hydraulic brake pressure control apparatus according to the first embodiment of the present invention.

Preferred embodiments of the present invention will now be described in detail with reference to accompanying drawings. In the drawings, like parts and components are designated by the same reference numerals. FIG. 1 is a sectional plan view showing a hydraulic brake pressure controlling apparatus for a vehicle according to the first embodiment of the invention. The controlling apparatus shown in FIG. 1 is of a cross-piping (X-piping) type for a front-wheel-driving vehicle, in which apparatus two brake systems are provided. A tandem type master cylinder 1 has a housing 2 in which a primary piston 3 and secondary piston 4 are disposed. A fluid pressure chambers 5 and 6 are formed inside the housing 2, and pressures of the chambers 5 and 6 are controlled by the primary and secondary pistons 3 and 4, respectively.

The fluid pressure chamber 5 controlled by the primary piston 3 is communicated with a wheel cylinder 8 of the front-right wheel FR through a fluid passage 7 in which a hold valve HV1 of the normally-open type solenoid valve is provided. The fluid pressure chamber 5 is also communicated with a wheel cylinder 9 of the rear-left wheel RL through the passage 7 and a cut valve CV1 of the normally-open type solenoid valve which is closed only during the traction control operation. Both the wheel cylinders 8 and 9 are communicated with a reservoir 11 through a fluid passage 10 in which a decay valve DV1 of the normally-closed type solenoid valve is provided.

Similarly, the fluid pressure chamber 6 is communicated with a wheel cylinder 13 of the front-left wheel FL through a fluid passage 12 in which a hold valve HV2 of the normally-open type solenoid valve is provided. The fluid pressure chamber 6 is also communicated with a wheel cylinder 14 of the rear-right wheel RR through the fluid passage 12 and a cut valve CV2 of the normally-open type solenoid valve which is closed only during the traction control operation. Both the wheel cylinders 13 and 14 are communicated with the reservoir 11 through a fluid passage 15 in which a decay valve DV2 of the normally-closed type solenoid valve is provided.

Inside the housing 2 of the master cylinder 1, there are provided a valve chamber 18 and 19 having openings 16 and 17 which are communicated with the fluid pressure chambers 5 and 6, respectively. The valve chambers 18 and 19 are communicated with each other through a fluid passage 20. The valve chamber 19 is communicated with a fluid pump 23 at an ejection thereof, while an intake opening of the fluid pump 23 is communicated with the reservoir 11. The fluid pump 23 is operated only during the anti-lock and traction control operations. The valve chambers 18 and 19 accommodate therein valve mechanisms 26 and 27 (described below) having intake valves 31 and 32 acting also as check valves, respectively.

Cylindrical intake sleeves 33 and 34 facing the fluid pressure chambers 5 and 6 for actuating the intake valves 31 and 32 are fixed to the primary and secondary pistons 3 and 4, respectively. The primary and secondary pistons 3 and 4 house therein center valves 35 and 36, respectively, which are movable along the longitudinal axis of the master cylinder relative to the primary and secondary pistons 3 and 4, respectively.

While a brake pedal 37 is not depressed down and, therefore, a push rod 38 connected to the brake pedal 37 through a booster 30 does not push the primary piston 3 as shown in FIG. 1, the fluid pressure chamber 5 is communicated with the reservoir 11 through the center valve 35 which opens, a communicating passage 39 in the primary piston 3, an annular chamber 41 formed at periphery of the pistons 3, and a fluid passage 43. In this condition, similarly, the fluid pressure chamber 6 is communicated with the reservoir 11 through the center valve 36 which opens, a communicating passage 40 in the secondary piston 4, an annular chamber 42 formed at periphery of the piston 4, and a fluid passage 44.

If the brake pedal 37 is depressed down by the vehicle driver, the push rod 38 is actuated thereby moving the primary piston 3 leftwardly in the figure, the center valve 35 is closed to thereby prevent the fluid pressure chamber 5 from hydraulically communicating with the reservoir 11. Accordingly, the pressure inside of the fluid pressure chamber 5 increases and, therefore, the brake fluid in the fluid pressure chamber 5 is supplied to the wheel cylinders 8 and 9 through the hold valve HV1 which opens. As a result, the wheels FR and RL of one of the brake system brake. The increase of the pressure in the fluid pressure chamber 5 causes the actuation of the secondary piston 4 so that the center valve 36 is closed thereby preventing the fluid pressure chamber 6 from hydraulically communicating with the reservoir 11. As a result, the fluid pressure in the fluid pressure chamber 6 also increases and, therefore, the brake fluid in the chamber 6 is supplied to the wheel cylinders 13 and 14 through the hold valve HV2 which opens so that the wheels FL and RR of the other of the brake system brake.

Such positional relationship and operation among the members described above are achieved by stop bolts 45 and 46 the center valves 35 and 36 are provided at an end thereof, respectively, stop bushings 47 and 48 engaged with heads 45a and 46a of the stop bolts 45 and 46, respectively, springs 49 and 50 compressedly disposed between the stop bushings 47 and 48 and the intake sleeves 33 and 34, respectively, and springs 51 and 52 always urging the center valves 35 and 36 toward their closed position.

A cylindrical auxiliary piston 53 is housed in the annular chamber 41 formed between the housing 2 of the master cylinder 1 and the primary piston 3 so as to slidable relative both to the housing 2 and the primary piston 3 along the common longitudinal axis of the primary piston 3. The auxiliary piston 53 is provided with an annular step 53b one side (right side in FIG. 1) surface of which receives a pressure of the fluid supplied to an auxiliary fluid pressure chamber 54. A stopper 55 is provided inside the housing 2 so that the stopper 55 opens and closes the auxiliary fluid pressure chamber 54 and inhibits the further rightward movement of the auxiliary piston 53. The auxiliary fluid pressure chamber 54 is communicated with the valve chamber 18 through a fluid passage 56 in which an anti-lock valve ALV is provided, which valve ALV is of the normally-open type solenoid valve and closes only during the anti-lock control operation. The brake fluid pressurized by the fluid pump 23 is supplied to the auxiliary fluid pressure chamber 54 through the fluid passage 21, the fluid passage 20 communicated between the valve chambers 18 and 19 and the fluid passage 56. On the other hand, the auxiliary fluid pressure chamber 54 also communicated with the reservoir 11 through a fluid passage 57 in which a traction control valve TCV of the normally-open type solenoid valve is provided, which valve TCV closes only during the traction control operation.

As described above, according to the hydraulic brake pressure controlling apparatus of the present invention, there is provided in the fluid passage 56 the anti-lock valve ALV which closes only during the anti-lock control operation to thereby prevent the fluid discharge from the valve chambers 18 and 19 to the reservoir 11 through auxiliary fluid pressure chamber 54. Further, the fluid passage 56 is connected to the fluid passage 20 and 21 communicated between the exhaust end of the fluid pump 23 and the fluid pressure chambers 5 and 6, and the auxiliary fluid pressure chamber 54 is communicated with the reservoir 11 through the fluid passage 57 in which the traction control valve TCV of the normally-open type which valve closes only during the traction control operation is provided. Accordingly, except during the anti-lock control and traction control operation, the pressure in the valve chambers 18 and 19 and the auxiliary chamber 54 is the atmospheric pressure, and there remains no fluid pressure in the passage connected from the fluid pump 23 to the traction control valve TCV through the anti-lock valve ALV.

A relief valve 22 is disposed in the fluid passage 21 connected between the fluid pump 23 and the valve chamber 19. The relief valve 22 comprises a relief piston 22a accommodating therein a valve spring 22b and a ball valve 22c, a relief spring 22d urging the relief piston 22a against the fluid pressure exhausted by the fluid pump 23, and a valve rod 22e protruded inside the relief piston 22a for opening the ball valve 22c. When the pressure in the fluid passage 21 increases, the relief piston 22a moves rightward (of FIG. 1) while compressing the relief spring 22d. When the valve rod 22e comes into abutment against the ball valve 22c, the ball valve 22c is removed from a valve seat 22f disposed on an inner peripheral wall of the relief piston 22a so that fluid passage 21 comes into communication with the reservoir 11 thereby preventing the excessive pressure in the fluid passage 21.

Further, since the relief piston 22a is always urged leftward (of FIG. 1) by the relief spring 22d, the relief spring 22a moves in accordance with the variation of the fluid pressure in the fluid passage 21, so that a shock pressure which may be generated by the fluid pump 23 is effectively absorbed.

In the relief valve 22, since the urging direction of the ball valve 22c toward the valve seat 22f is the same as the flowing direction of the fluid pressure from the passage 21 while the valve 22c is opened, the ball valve 22c is urged against the valve seat 22f both by the valve spring 22b and the fluid pressure during the opening of the valve 22c. Accordingly, the relief valve 22 achieves extremely good sealability.

The spring modulus of the relief spring 22d is so determined that the hydraulic pressure by which the ball valve 22c comes into abutment against the valve rod 22e is higher than the highest pressure generated in the fluid pressure chambers 5 and 6.

FIG. 2 is an enlarged sectional view showing the valve mechanism 26. The valve chamber 18 is formed by a cup-shaped plug 60 secured in the housing 2 by a set bolt 59. The valve chamber 18 is provided with an opening part 16 opening to the fluid pressure chamber 5 and a piston chamber 61 positioned beside the opening part 16 on the common axis therewith. In the piston chamber 61, there is provided a piston 63 having a center hole 62 and acting as a valve holding member. The piston 63 is slidable on an axis which is perpendicular to an inner surface 5a of the fluid pressure chamber 5. A conical valve seat 63a is formed at an end portion opposite to the opening part 16 of the center hole 62.

An intake valve 31 consisting of a stick-like poppet valve is disposed slidably in the opening part 16 of the valve chamber 18 and center hole 62 of the piston 63. The intake valve 31 is provided with a head 31a which protrudes into the fluid pressure chamber 5 and extracts into the piston chamber 61 in accordance with the sliding of the intake valve 31. The intake valve is further provided with a semi-spherical valve member 31b abuttable against the valve seat 63a of the piston 63. The head 31a and a part 31d of spindle portion of the piston 31 are rectangular shaped in cross section as shown in FIGS. 3 and 4. Corners of the rectangular portions of the head 31a and the part 31d of the spindle portion of the piston 31 act as supports which always contact to inner peripheral walls of the opening part 16 of the valve chamber 18 and the center hole 62 of the piston 63, respectively, so that the intake valve 31 smoothly slides in the opening part 16 and the center hole 62 without any irregular movement when the intake valve 31 is retracted by the intake sleeve 33. The rectangular portions of the head 31a and the part 31d form passages along outer periphery of the intake valve 31 through which the brake fluid passes.

A spring holder 65 is connected as a unit to the piston 63. A check spring 66 is compressedly disposed between the spring holder 65 and the intake valve 31 so that the valve member 31b of the intake valve 31 is always urged against the valve seat 63a of the piston 63 with a predetermined check force. The piston 63 is always urged in a direction opposite the opening part 16 by a set spring 67 compressedly disposed between the spring holder 65 and a wall of the valve chamber 18. The elastic force of the set spring 67 is larger than that of the check spring 66, so that a base end 31c of the intake valve 31 is held in contact with an inner wall 60a of the plug 60 by the elastic force of the set spring 67 as shown in FIG. 2. The elastic force of the set spring 67 also acts between the valve seat 63a of the piston 63 and valve member 31b of the intake valve 31.

That is, under a condition other than during the anti-lock control and the traction control operations, the fluid pump 23 is not actuated while both anti-lock valve ALV and traction control valve TCV open thereby supplying no fluid pressure to the valve chamber 18 as is apparent from FIG. 1. Under this condition, since no fluid pressure is supplied to the valve chamber 18, an end surface 63b is spaced apart from the wall 61a of the piston chamber 61 and, therefore, the head 31a is kept retracting in the opening part 16.

In this condition, if the brake pedal 37 is depressed down and the fluid pressure in the fluid pressure chamber 5 increases by the primary piston 3, the fluid pressure is supplied to the end surface 63b of the piston 63 so that the valve seat 63a of the piston 63 is strongly urged against the valve member 31b of the intake valve 31 by the fluid pressure thereby further improving the sealability.

FIG. 5 is an enlarged sectional view showing the valve mechanism 26 during the anti-lock control or traction control operation, in which the fluid pump 23 is actuated and one of the anti-lock valve ALV and the traction control valve TCV closes thereby shutting the fluid passage to the reservoir 11. In the condition shown in FIG. 5, the highly pressurized brake fluid is supplied from the fluid pump 23 to the valve chamber 18 through the fluid passages 21 and 20. The fluid pressure is supplied to the other end surface 63c of the piston 63 opposite the end surface 63b thereof so that the piston 63 moves toward the opening part 16 against the elastic force of the set spring 67 while the intake valve 31 is kept abutting against the valve seat 63a by the elastic force of the check spring 66. The piston 63 stops further moving by an abutment of the end surface 63b thereof against the wall 61a of the piston chamber 61, under the condition where the head 31a of the intake valve 31 protrudes into the fluid pressure chamber 5 as shown in FIG. 5. In this condition, if the primary piston 3 moves leftward of FIG. 1, the intake sleeve 33 comes into contact with the head 31a of the intake valve 31 as shown in FIG. 6. In the next stage, the intake sleeve 33 depresses the intake valve 31 down against the elastic force of the check spring 66 thereby removing the valve member 31b from the valve seat 63a of the piston 63 so that the brake fluid which is highly pressurized is supplied into the fluid pressure chamber 5.

The operation of the hydraulic brake pressure controlling apparatus according to the first embodiment of the invention will be described with reference to FIGS. 7 and 8.

FIG. 7 is a timing chart showing the change in fluid pressure during the normal braking operation and the subsequent anti-lock control operation together with the open/close operations of the anti-lock valve ALV, traction control valve TCV, hold valves HV1 and HV2, decay valves DV1 and DV2, and cut valves CV1 and CV2. Actually, each of the two brake systems of the cross-piping type brake apparatus is independently controlled. However, the operation will be described below assuming that both the systems are simultaneously controlled.

(A) Normal braking operation ($t_0$ to $t_1$ in FIG. 7)

While the anti-lock valve ALV and traction control valve TCV open, the hold valves HV1 and HV2 open, decay valves DV1 and DV2 close, and cut valves CV1 and CV2 open, as shown in FIG. 1, when the brake pedal 37 is depressed down, the primary piston 3 is urged by the push rod 38 to move leftward in FIG. 1 and, accordingly, the secondary piston 4 moves leftwardly to thereby close the center valve 36. In this condition, since the valve mechanisms 26 and 27 are positioned as shown in FIG. 2, the fluid pressure is supplied to inside the fluid pressure chambers 5 and 6 and to the wheel cylinders 8, 9, 13 and 14 so that the braking operation is achieved.

(B) Anti-lock control operation

While the fluid pressure in the wheel cylinders 8, 9, 13 and 14 increase, if a wheel speed (wheel speed of the wheel of each of the brake systems to be controlled, e.g. wheel speed of the front-right wheel FR and rear-left wheel RL under select low) rapidly decelerates to reach a predetermined decelerating amount at a time point $t_1$, a control circuit (not shown) comprising a microcomputer generates a hold signal and, therefore, an anti-lock control starts from the point $t_1$.

(1) Holding Mode ($t_1$ to $t_2$ in FIG. 7)

At the time point $t_1$, the anti-lock valve ALV closes while the hold valves HV1 and HV2 close and, therefore, both the fluid passage 12 communicating to the wheel cylinders 8 and 9 and the fluid passage 14 to the wheel cylinders 13 and 14 close to thereby keep the fluid pressure in the wheel cylinders 8, 9, 13 and 14 as they are. In this condition, the valve mechanisms 26 and 27 is under the condition shown in FIG. 5 in which the heads 31a and 31b of the intake valves 31 and 32 protrude into the fluid pressure chambers 5 and 6, respectively.

Under such a condition, if the intake sleeves 33 and 34 is positioned where they press down the intake valves 31 and 32, respectively, the valve mechanisms 26 and 27 come to be in a condition shown in FIG. 6 under which the brake fluid pressure highly pressurized by the fluid pump 23 is supplied into the fluid pressure chambers 5 and 6. By the brake fluid pressure, the pistons 3 and 4 are pushed back to a position at which the intake sleeves 33 and 34 disengage from the intake valves 31 and 32 and, therefore, the fluid pressure inside the fluid pressure chambers 5 and 6 come to be a pressure in proportion to the depressing force applied to the brake pedal 37.

In the above case, by the positions of the primary and secondary pistons 3 and 4, the intake sleeves 33 and 34 depress the intake valves 31 and 32, respectively thereby communicating the fluid pressure chambers 5 and 6 with the exhausting end of the fluid pump 23. Therefore, the pistons 3 and 4 are pushed back to a position at which the intake valves 31 and 32 close the opening parts 16 and 17, respectively, by the fluid pressure ejected by the fluid pump 23. Accordingly, even if the fluid pressure source is failed, the fluid pressure chambers 5 and 6 can keep therein a sufficient pressure.

(2) Pressure decreasing Mode (t₂ to t₃)

When the system speed decreases further, the decay valves DV1 and DV2 open at a time point t₂ so that the fluid pressure in the wheel cylinders 8, 9, 13 and 14 is discharged to the reservoir 11 through the fluid passages 10 and 15. Thus, the pressure in the wheel cylinders decreases.

(3) Holding Mode (t₃ to t₄)

At a time point t₃ at which the system speed starts to restore its speed after a low peak point by means of decreasing the brake fluid pressure, the decay valves DV1 and DV2 close to be in a holding mode again.

(4) Pressure increasing Mode (t₄ to t₅)

When the system speed reaches the high peak point, the hold valves HV1 and HV2 open to move the pistons 3 and 4 and to open the intake valves 31 and 32 so that the fluid pressure is supplied from the fluid pump 23 to the wheel cylinders 8, 9, 13 and 14 through the fluid pressure chambers 5 and 6. In the pressure increasing mode starting from a time point t₄, the hold valves HV1 and HV2 open and close at small intervals and, accordingly, the brake fluid pressure increases step by step.

(5) Holding Mode (t₅ to t₆)

The system speed starts to decrease by means of increasing the brake fluid pressure to be in a holding mode in which the hold valves HV1 and HV2 close. Then, at a time point t₆, the decay valves DV1 and DV2 to be again in the pressure decreasing mode.

(C) Traction control operation

Figure 8:
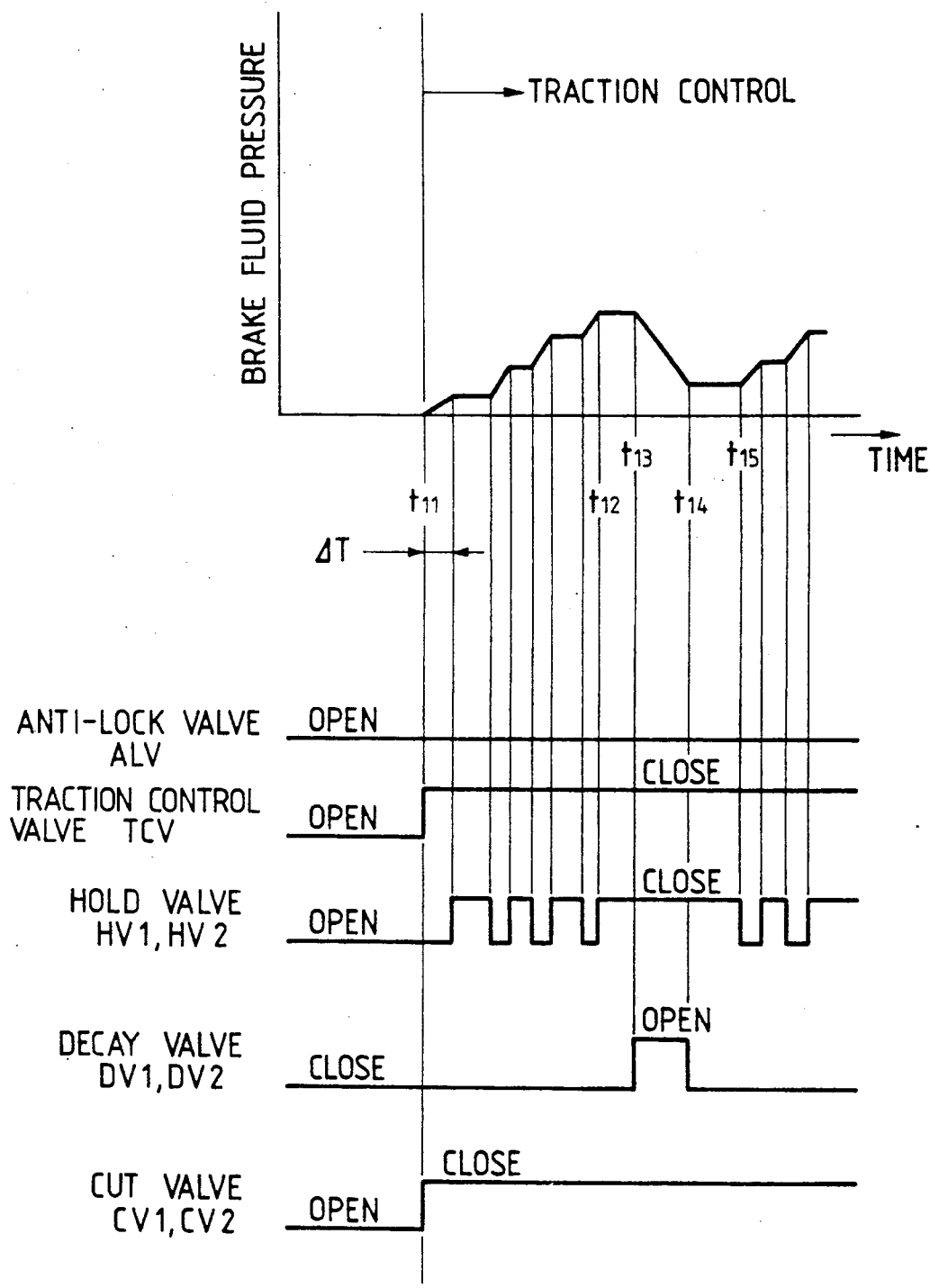
FIG. 8 is a timing chart explaining the traction control operation of the apparatus shown in FIG. 1.

During a traction control operation in which the driving wheels FR and FL of the vehicle are prevented from slipping when the vehicle starts or accelerates, the pressure increasing mode starts at a time point t₁₁ in FIG. 8 at which a control circuit (not shown) comprising a microcomputer detects the slippage of the driving wheels FR and FL.

(1) Pressure increasing Mode (t₁₁ to t₁₂)

At the time point t₁₁, the cut valves CV1 and CV2, and the traction control valve TCV close, thereby shutting a communication between the wheel cylinders 9, 14 of the non-driving wheels RL, RR and fluid pressure chambers 5, 6 of the master cylinder 1, and a communication between the auxiliary fluid pressure chamber 54 and the reservoir 11. In this condition, since the anti-lock valve ALV opens, the auxiliary fluid pressure chamber 54 is communicated with the ejection end of the fluid pump 23 so that the pressure inside the auxiliary fluid pressure chamber 54 increases thereby moving the auxiliary piston 53 leftwardly in FIG. 1. In this operation, since the primary piston 3 is urged by the auxiliary piston 53 to move leftwardly in the figure, the pressure in the wheel cylinders 8 and 13 increase to be in a pressure increasing mode.

As shown in FIG. 8, during a predetermined time period ΔT from the time point t₁₁ at which the traction control operation starts, the hold valves HV1 and HV2 open so that an auxiliary pressure increasing is achieved. Then, the hold valves HV1 and HV2 close to hold the brake fluid pressure. Subsequently, the hold valves HV1 and HV2 open and close at small intervals thereby increasing the hydraulic pressure step by step.

(2) Holding Mode (t₁₂ to t₁₃ in FIG. 8)

From a time point t₁₂ at which the slippage of the driving wheels FR and Fl is suppressed, the hold valves HV1 and HV2 close to be in a holding mode.

(3) Pressure decreasing Mode (t₁₃ to t₁₄)

From a time point t₁₃, the decay valves DV1 and DV2 close to be in a pressure decreasing mode. The subsequent steps of the traction control operation are repeated as in the same manner as that of the anti-lock control operation.

In this condition, an annular step 53b of the auxiliary piston 53 is supplied with a fluid pressure in the auxiliary fluid pressure chamber 54 the pressure amount of which is equal to that ejected from the fluid pump 23. Further, the primary piston 3 receives the fluid pressure in the fluid pressure chamber 5 for an area substantially equal to a sectional area of the fluid pressure chamber 5. When the area of the primary piston 3 which receives the fluid pressure is represented by $A_M$, an area of the auxiliary piston 53 receiving the fluid pressure is represented by $A_B$, and the fluid pressure supplied from the fluid pump 23 is represented by $P_A$, fluid pressure $P_M$ in the fluid pressure chamber 5 while the intake valve 31 closes can be obtained by the following equation;

$$P_M = (A_B/A_M) \cdot P_A$$

That is, the fluid pressure $P_M$ in the fluid pressure chamber 5 is determined by an area ratio $(A_B/A_M)$. Accordingly, the highest pressure applied to the wheel cylinders 8 and 13 is set to be smaller than the fluid pressure $P_A$ supplied from the ejection end of the fluid pump 23 by setting the area ratio to be smaller than 1. Such a setting of the area ratio is advantageous in that the vibration which may occur during the traction control operation is effectively eliminated to thereby achieving a smooth traction control operation. Further, the large load which may be applied to the driving system is prevented.

Figure 9:
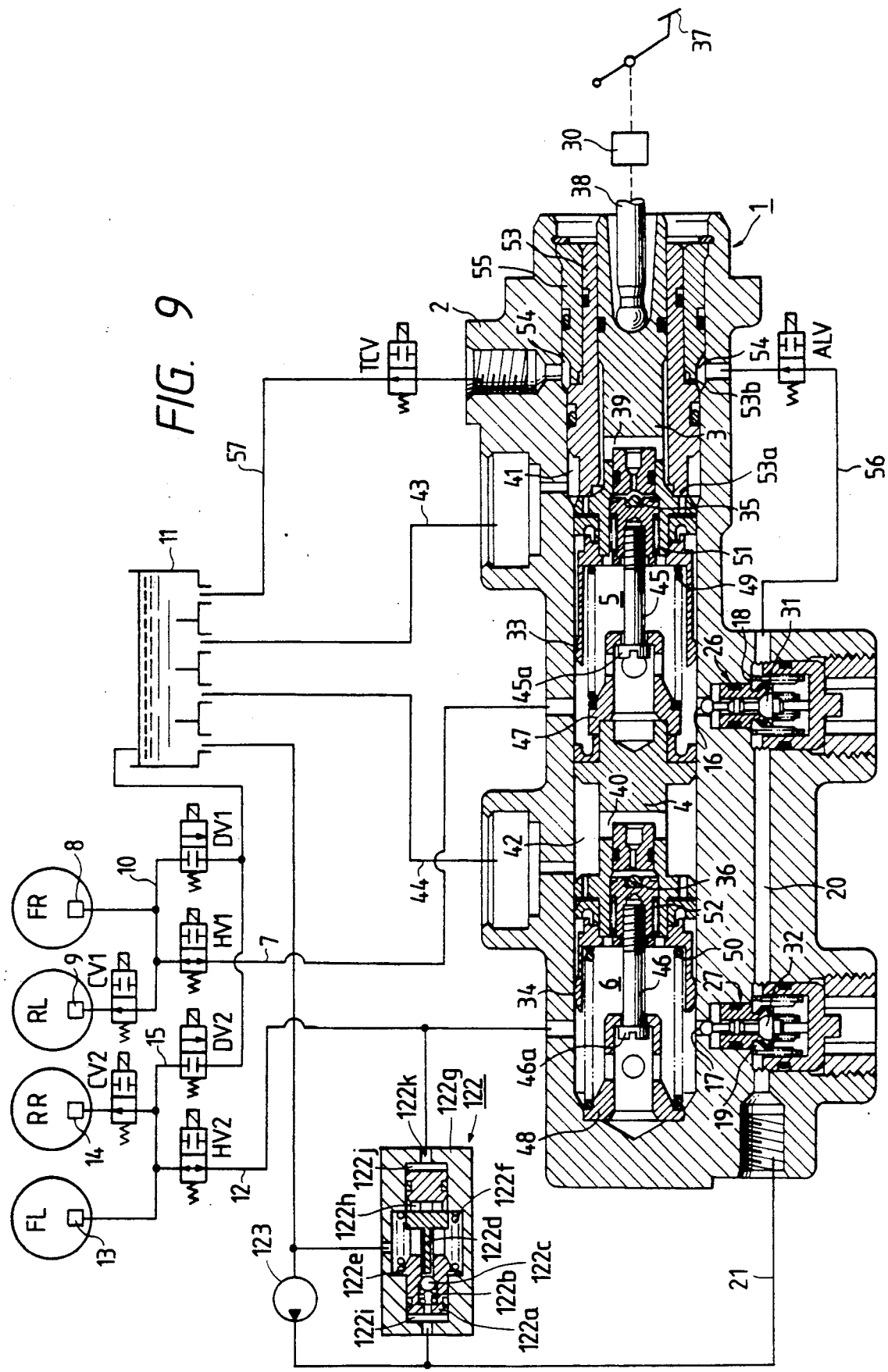
FIG. 9 is a sectional view showing a hydraulic brake pressure control apparatus according to the second embodiment of the present invention.

FIG. 9 is a sectional view showing a hydraulic brake pressure control apparatus according to the second embodiment of the present invention. The second embodiment of the invention shown in FIG. 9 is substantially the same in construction as that of the first embodiment shown in FIG. 1 and, therefore, the description below concerning the second embodiment is referred merely to the different part from the first embodiment.

In the second embodiment shown in FIG. 9, a relief valve 122 is disposed in a fluid passage communicating the fluid pump 23 with valve chamber 19. The relief valve 122 comprises a relief piston 122a accommodating therein a valve spring 122b and a ball valve 122c, a relief spring 122f for urging the relief piston 122a against the ejection pressure from the fluid pump 23, and a valve rod 122d protruding into the relief piston 122a for opening the ball valve 122c. The relief spring 122f is compressedly provided between a spring receiver 122e and a casing 122g of the relief valve 122, and the valve rod 122d is accommodated in a groove 122h formed on the relief piston 122a so as not to interfere the movement of the relief piston 122a, so that the valve rod 122d comes into contact to a part of the casing 122g during an engagement with the ball valve 122c. A part of the casing 122g and a rear portion of the relief piston 122a form a piston chamber 122j at a rear end (right end in FIG. 9), which chamber 122j communicates with the fluid pressure chamber 6 of the master cylinder through an opening 122k so that the fluid pressure of in the fluid pressure chamber 6 is supplied to the relief piston 122a.

In the relief valve 122 thus constructed, when the brake fluid pressure in the fluid passage 21 increases, the relief piston 122a moves rightwardly (in FIG. 9) while compressing the relief spring 122f. When the valve rod 122d comes into abutment against the ball valve 122c, the ball valve 122c is removed from the valve seat by the valve rod 122d thereby discharging the brake fluid in the fluid passage 21 to the reservoir 11 and, hence, no abnormal excessive pressure will be generated.

In the relief valve 122, since the relief piston 122a is urged leftwardly in FIG. 9 by the relief spring 122f, the relief piston 122a moves rightwardly and leftwardly in accordance with a change in pressure of the brake fluid in the fluid passage 21 thereby varying a capacity of a fluid chamber 122i in the casing 122g, so that a shock pressure which may be generated by the fluid pump 23 is effectively absorbed.

The operations of each valves during the anti-lock and traction control of the second embodiment are the same as that of the first embodiment.

Figure 10:
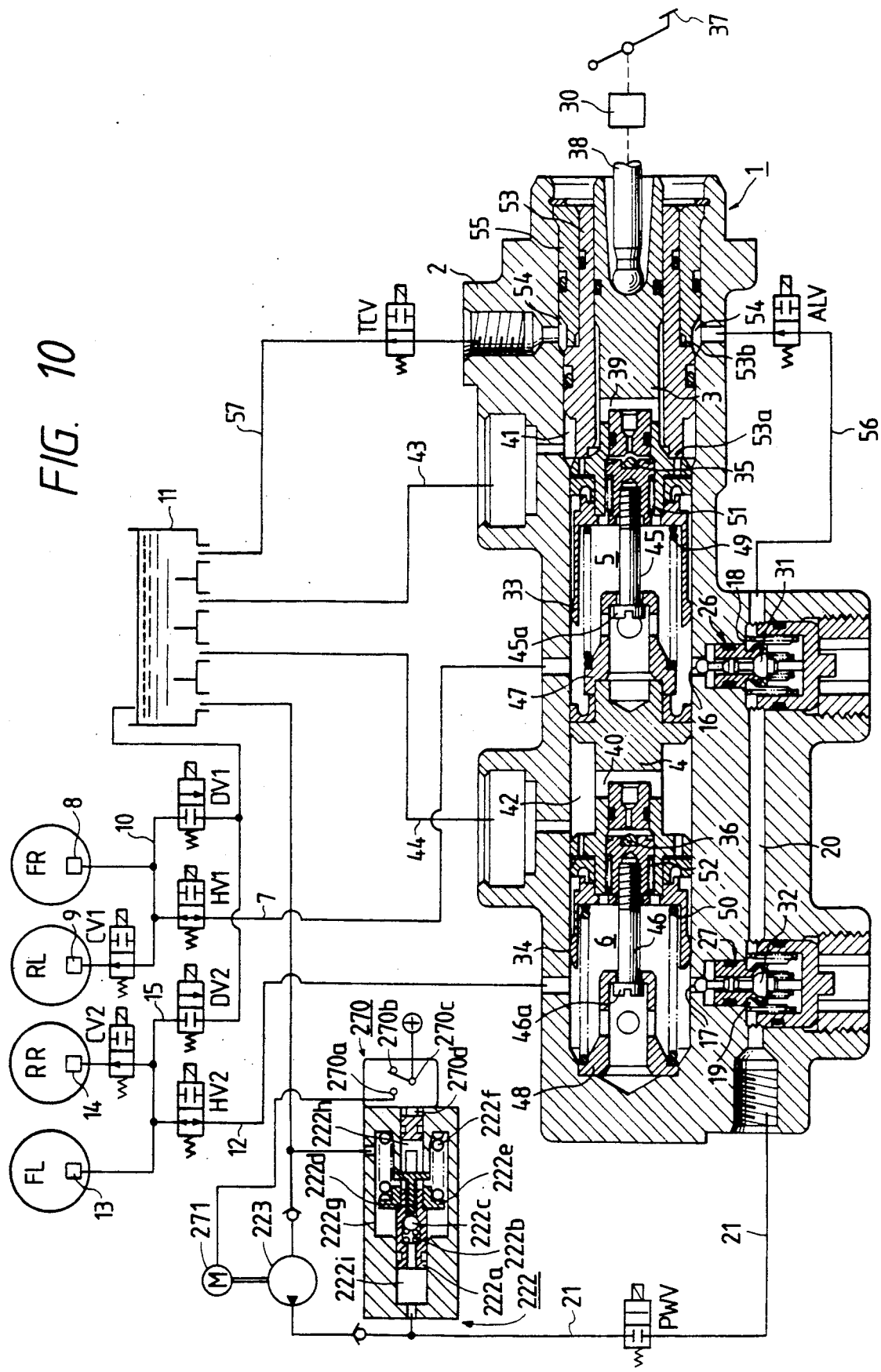
FIG. 10 is a sectional view showing a hydraulic brake pressure control apparatus according to the third embodiment of the present invention.

FIG. 10 is a sectional view showing a hydraulic brake pressure control apparatus according to the third embodiment of the invention. The third embodiment of the invention shown in FIG. 10 is substantially the same in construction as that of the first and second embodiments shown in FIGS. 1 and 9 and, therefore, the description below concerning the third embodiment is referred merely to the different part from the first embodiment.

In the third embodiment shown in FIG. 10, a supply valve PWV of a normally-closed type solenoid valve is disposed in a fluid passage 21 communicating with an exhausting end of the fluid pump 223. The apparatus according to the third embodiment is provided with a relief valve 222 comprising a relief piston 222a accommodating therein a valve spring 222b and a ball valve 222c, a relief spring 222f for urging the relief piston 222a against the fluid pressure ejected from the fluid pump 23, and a valve rod 222d protruding into the relief piston 222a for opening the ball valve 222c. The relief spring 222f is compressedly provided between a spring receiver 222e formed on the relief piston 222a and a casing 222g. The valve rod 222d is accommodated in a groove 222h formed on the piston 222a, so that the valve rod 222d comes into abutment against a part of the casing 222g when the rod 222d is engaged with the casing 222g.

In the third embodiment of the invention thus constructed, a switch 270 consisting of a micro-switch is disposed at a rear side (right side in FIG. 10) of the relief valve 222. The switch 270 includes two fixed terminals 270a and 270b and a movable terminal 270c connecting to a power source (not shown). The fixed terminal 270a is connected to a motor 271 for actuating the fluid pump 23 while the fixed terminal 270b is free. The movable terminal 270c is operated by an actuator 270d disposed at a rear end (right end in FIG. 10) of the relief piston 222a of the relief valve 222. When the rear end of the relief piston 222a pushes the actuator 270d, the movable terminal 270c is actuated to contact to the fixed terminal 270b thereby cutting a supply of the power to the motor 271.

In the relief valve 222 of the third embodiment thus constructed, when the brake fluid pressure in the fluid passage 21 increases, the relief piston 222a moves rightwardly in FIG. 10 while compressing the relief spring 222f. Then the valve rod 222d comes into abutment against the ball valve 222c, the ball valve 222c is disengaged from the valve seat by the valve rod 222d to thereby discharge the brake fluid in the fluid passage 21 to the reservoir 11, so that an abnormal excessive pressure is prevented. In this operation, the rear (right in the figure) end of the relief piston 222a urges the actuator 270d to turn off the motor 271. Subsequently, if the fluid pressure in the fluid passage 21 decreases, the relief piston 222a moves leftwardly in FIG. 10 and, accordingly, the movable terminal 270c of the switch 270 comes into contact to the fixed terminal 270a to thereby turn on the motor 271 to actuate the fluid pump 23 again.

In the relief valve 222, since the relief piston 222a is always urged leftwardly in FIG. 10 by the relief spring 222f, the relief piston 222a is movable rightwardly and leftwardly in accordance with the change in pressure of the brake fluid in the fluid passage 21, so that the a capacity of the fluid chamber 222i in the casing 222g varies and, hence, the shock pressure which may be generated by the fluid pump 23 can effectively be absorbed.

Further, according to the relief valve 222 of the third embodiment, since the urging direction of the ball valve 222c against the valve seat is the same as the discharging direction of the brake fluid pressure during the opening operation of the valve 222, the ball valve 222c is urged against the valve seat both by the valve spring 222b and the fluid pressure during the opening of the valve. Accordingly, the relief valve 222 can achieve extremely good sealability.

The operation of the third embodiment is substantially the same as that of the first embodiment. In the third embodiment, however, the condition of the intake valve 31 shown in FIG. 2 is achieved when the fluid pump 23 is not actuated, the supply valve PWV closes, both the anti-lock valve ALV and the traction control valve TCV open. On the other hand, the condition of the intake valve 31 shown in FIG. 5 is achieved when the supply valve PWV opens while one of the anti-lock valve ALV and the traction control valve TCV closes.

Figure 11:
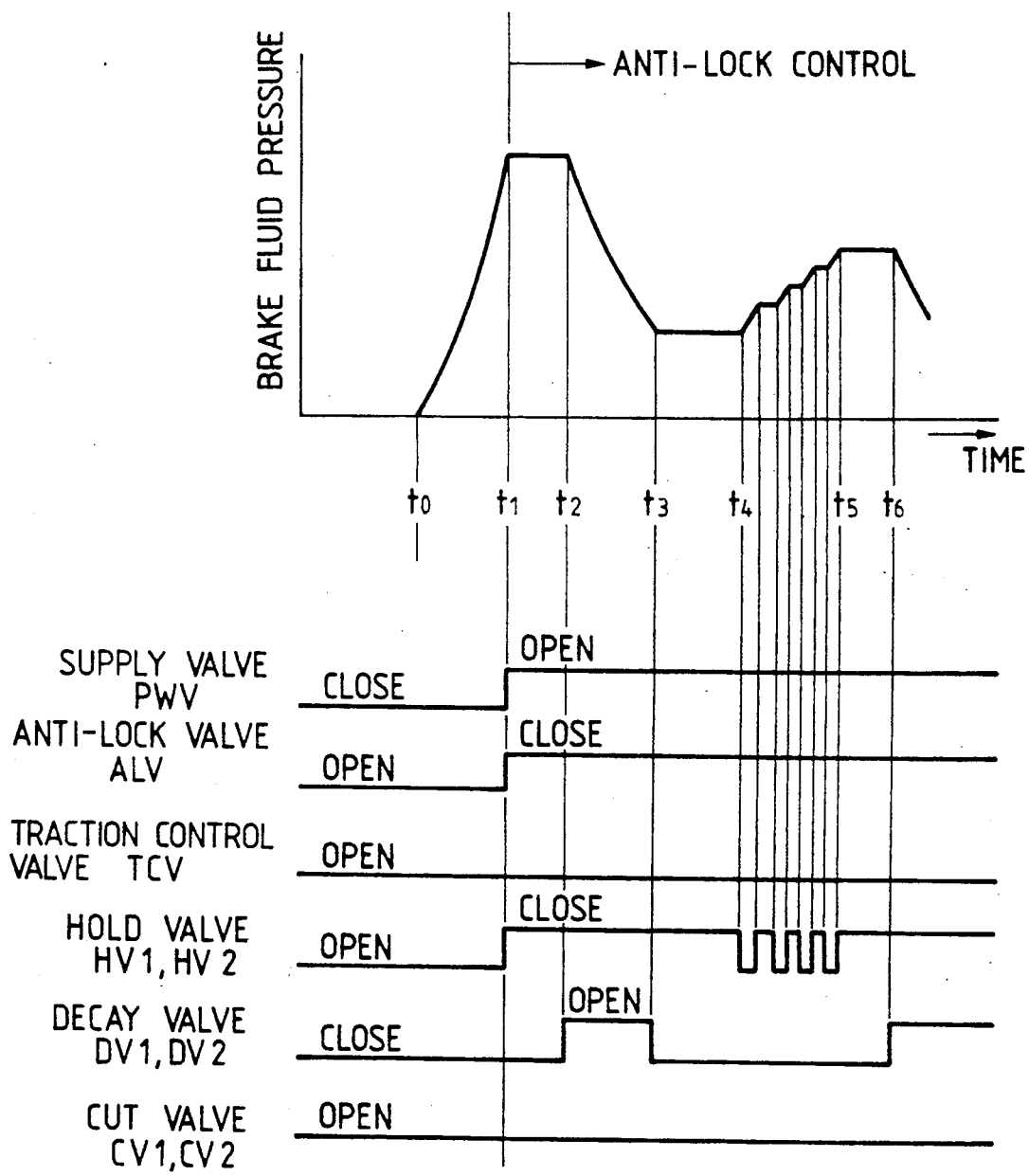
FIG. 11 is a timing chart explaining the anti-lock control operation of the apparatus shown in FIG. 10.
Figure 12:
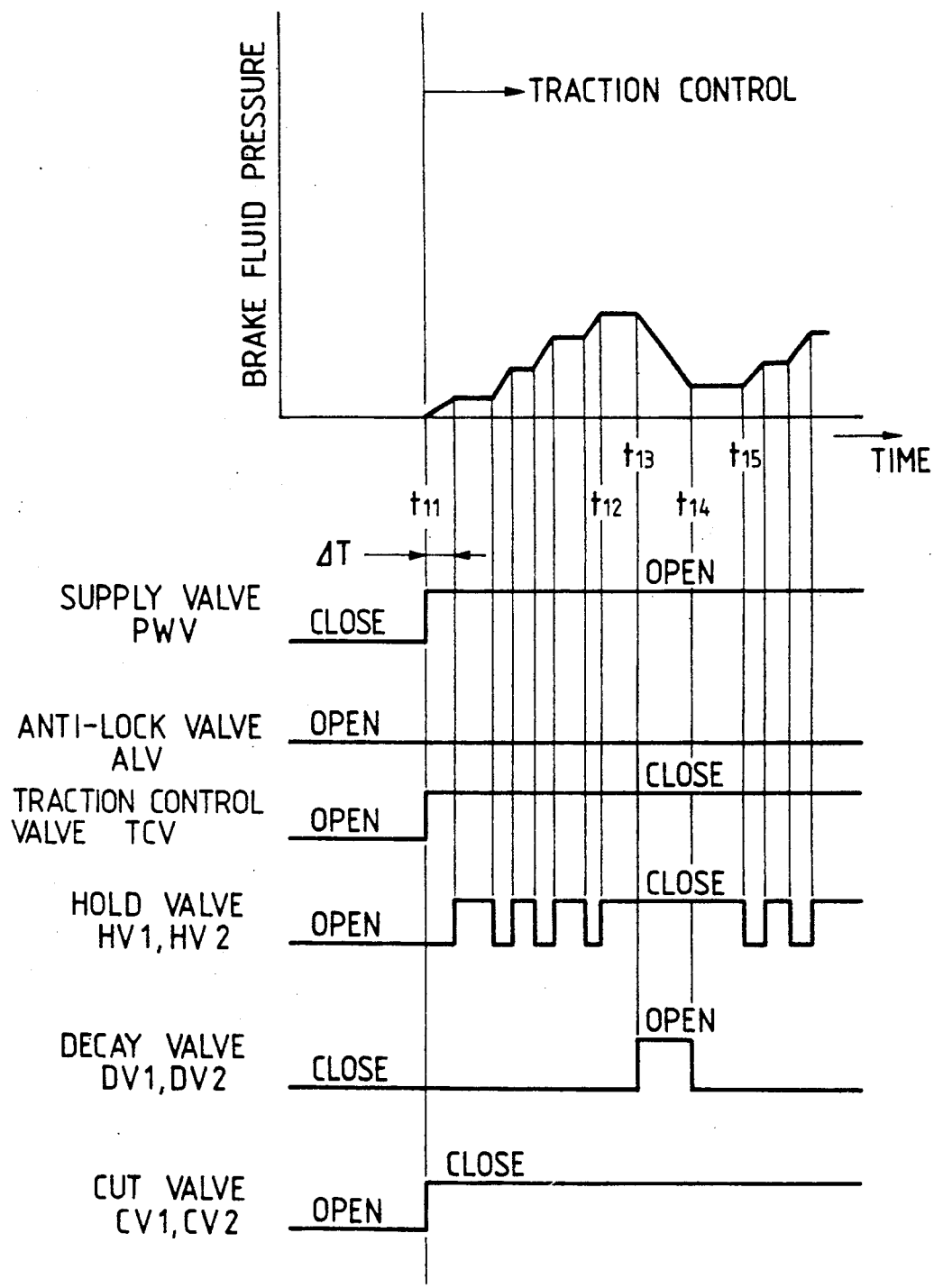
FIG. 12 is a timing chart explaining the traction control operation of the apparatus shown in FIG. 10.

FIGS. 11 and 12 are timing charts showing the anti-lock and traction control operations, respectively, of the hydraulic brake pressure controlling apparatus according to the third embodiment of the invention. The operations of the third embodiment shown in FIGS. 11 and 12 are substantially the same as that of the first embodiment shown in FIGS. 7 and 8. Therefore, the description will be referred merely as to the different portion.

In the normal braking operation described in paragraph (A) in the first embodiment, the supply valve PWV closes, whereas in the holding mode during the anti-lock and traction control operations described in paragraph (B)-(1), the supply valve PWV opens as shown in FIGS. 11 and 12.

Figure 13:
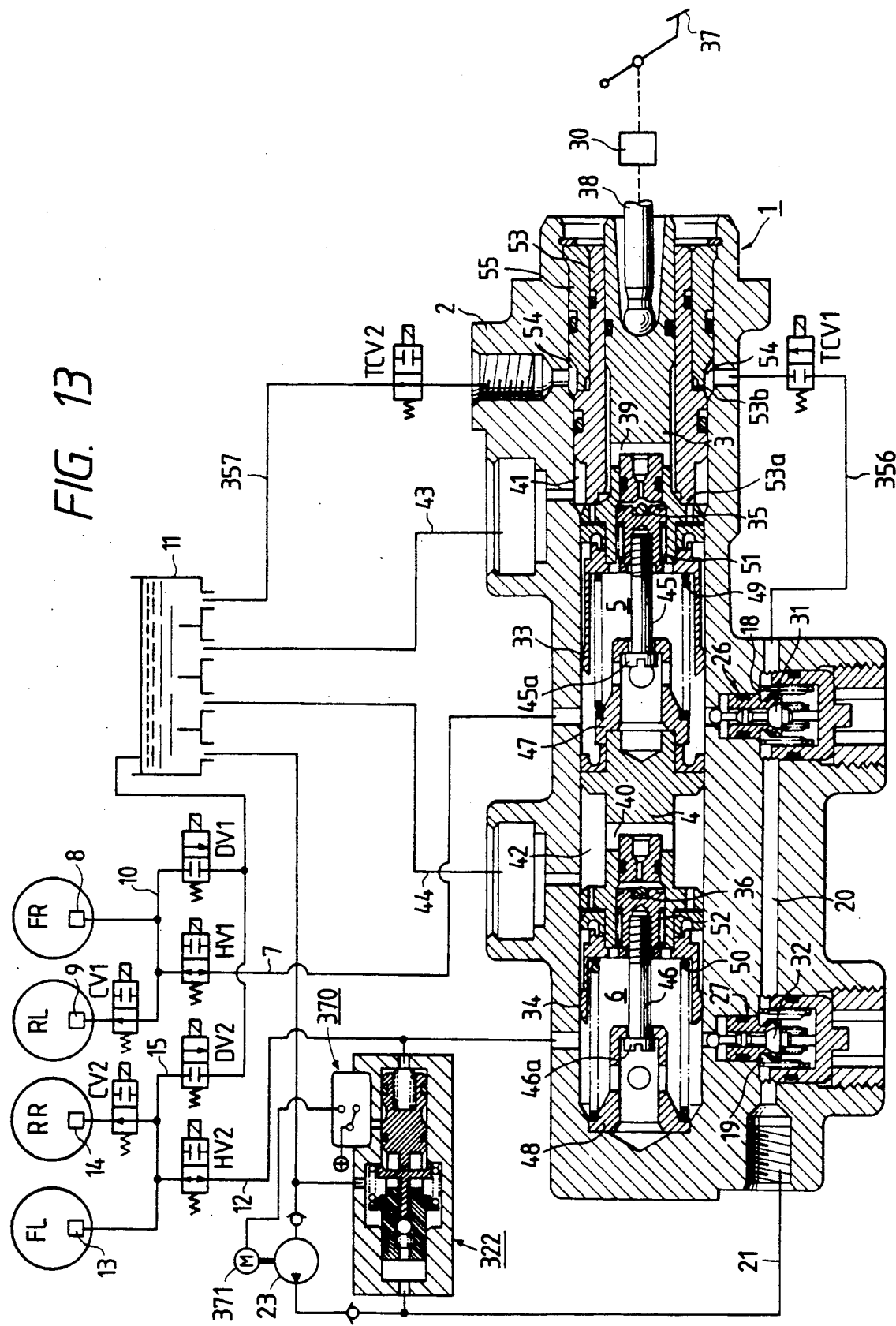
FIG. 13 is a sectional view showing a hydraulic brake pressure control apparatus according to the fourth embodiment of the present invention.

FIG. 13 is a sectional view showing a hydraulic brake pressure control apparatus according to the fourth embodiment of the invention. The fundamental structure and operation of the fourth embodiment are substantially the same as the first embodiment. Therefore, the description will be referred merely to different portions.

According to the fourth embodiment, as shown in FIG. 13, the auxiliary fluid pressure chamber 54 is communicated with the valve chamber 18 in the housing 2 through a fluid passage 356 disposing therein a first traction control valve TCV1 of a normally-closed type solenoid valve which opens merely during the traction control operation. By such an arrangement, merely during the traction control operation, the brake fluid pressurized by the fluid pump 23 is supplied to the auxiliary fluid pressure chamber 54 through the fluid passage 21 and the passage 20 communicating between the valve chambers 18 and 19. The auxiliary fluid pressure chamber 54 is connected to the reservoir 11 through a fluid passage 357 disposing therein a second traction control valve TCV2 of a normally-open type solenoid valve which closes merely during the traction control operation.

By the fluid pressure control apparatus according to the fourth embodiment of the invention thus constructed, no fluid pressure will be remained in the auxiliary fluid pressure chamber 54 except during the traction control operation.

Figure 14:
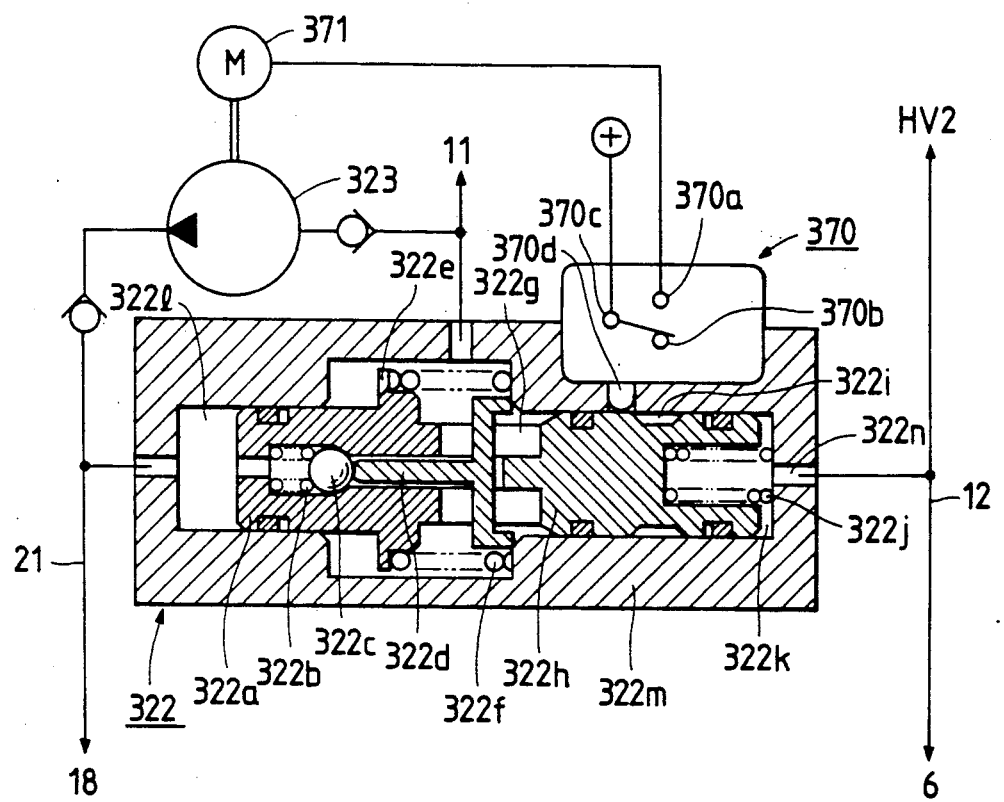
FIG. 14 is an enlarged sectional view showing a relief valve shown in FIG. 13.

In the fourth embodiment, a relief valve 322 is provided in the fluid passage 21 connecting between the fluid pump 23 and the valve chamber 19. FIG. 14 is an enlarged sectional view showing the relief valve 322.

As shown in FIG. 14, the relief valve 322 comprises a relief piston 322a encasing therein a valve spring 322b and a ball valve 322c, a relief spring 322f for urging the relief piston 322a against the exhausting pressure of the fluid pump 23, a valve rod 322d protruding into the relief piston 322a for opening the ball valve 322c, a piston 322h disposed adjacent (right side in FIG. 14) to the relief piston 322a and movable together with the relief piston 322a, and a spring 322j for moving unitary the relief piston 322a and the piston 322h.

The relief spring 322f is compressedly provided between a spring sheet 322e attached to the relief piston 322a and a casing 322m. The valve rod 322d is accommodated in a groove 322g formed on the relief piston 322a so as not to interfere with the movement of the piston 322a, and the valve 322c comes into abutment against a stepped part of the casing 322m when it is engaged with the ball valve 322c. The spring 322j is compressedly provided between an opening part of the piston 322h at a rear (right in the figures) end thereof and the casing 322m. A piston chamber 322k is formed at a rear (right) side of the relief valve 322 by a back surface of the piston 322h and a part of the casing 322m, so that the fluid pressure is supplied from the fluid pressure chamber 6 of the master cylinder to the piston 322h fluid passage 12 and a through hole 322n of the casing 322m.

A switch 370 consisting of a micro-switch is disposed on a part (upper-right part in FIG. 14) of the casing 322m of the relief valve. The switch 370 comprises two fixed terminals 370a, 370b, a movable terminal 370c connecting to a power source (not shown), and an actuator 370d. The fixed terminal 370a is connected to a motor 371 for actuating the fluid pump 23 whereas the fixed terminal 370b is free. When the actuator 370d is pushed by an outer peripheral surface (upper surface in FIG. 14) of the piston 322h, the movable switch 370c is changed to contact to the fixed terminal 370b, as shown in FIG. 14, to thereby cut the supply of the power to the motor 371. On the other hand, when the actuator 370d falls down into a concave portion 322i formed on the outer peripheral surface of the piston 322h, the movable terminal 370c is changed to contact to the fixed terminal 370a to thereby turn on the fluid pump.

In the relief valve of the fourth embodiment of the invention thus constructed, when the brake fluid pressure in the fluid passage 21 increases, the relief piston 322a moves rightwardly in FIG. 14 while compressing the relief spring 322f. Subsequently, when the valve rod 322d comes into abutment against the ball valve 322c, the ball valve 322c is removed from the valve seat by the valve rod 322d to thereby discharging the brake fluid in the fluid passage 21 to the reservoir 11. Thus, no abnormal excessive pressure will occur in the fluid passage 21. When the fluid pressure in the fluid passage 21 decreases, both the relief piston 322a and the piston 322h unitary move leftwardly in the figure, the actuator 370d of the switch 370 which actuator is pushed by the outer peripheral surface of the piston 322h falls down into the concave portion 322i formed on the outer peripheral surface of the piston 322h, thereby turning on the fluid pump again.

Since the relief piston 322a is urged leftwardly in FIG. 14 by the relief spring 322f, the piston 322a moves rightwardly and leftwardly in accordance with the change in pressure of the brake fluid in the fluid passage 21 thereby varying a capacity of a fluid chamber 322l in the casing 322m so that the shock pressure which may be generated by the fluid pump 23 can effectively be absorbed.

According to the fourth embodiment of the invention, during no braking operation, since the brake fluid corresponding to the elastic force of the relief spring 322f is always supplied into the fluid passage 21 in which the relief valve 322 is disposed and into the fluid passage 20 communicating between the valve chambers 18 and 19, and since the first traction control valve TCV closes, the intake valves 31 and 32 to which the fluid pressure is supplied by the valve chambers 18 and 19 moves upwardly as shown in FIG. 13, and both the heads 31a and 32a protrude into the fluid pressure chambers 5 and 6, respectively.

During the no braking operation, therefore, the fluid pressure is applied to an end surface 63c of the piston 63 so that the piston 63 moves toward the opening part 16 against the elastic force of the set spring 67 while the intake valve 31 is kept being abutted to the valve seat 63a by the elastic force of the check spring 66 so that the end surface 63b of the piston 63 is kept abutting against the wall surface 61a of the piston chamber 61. Under this condition, the head 31a of the intake valve 31 protrudes into the opening part 16 as shown in FIG. 5.

On the other hand, during the braking operation, anti-lock or traction control operation, the condition of the valve mechanisms shown in FIG. 5 is maintained until the stroke of the intake sleeve 33 reaches a predetermined amount so that the intake sleeve 33 is engaged with the head 31a of the intake valve 31.

The elastic force of the relief spring 322f is so set that the brake fluid pressure for urging the ball valve 322c against the valve rod 322d to discharge the brake fluid is higher than the highest fluid pressure generated in the fluid pressure chambers 5 and 6.

The fundamental operation of the fourth embodiment is the same as that of the first embodiment. Accordingly, only the different operation will be described with reference to FIGS. 15 and 16.

Figure 15:
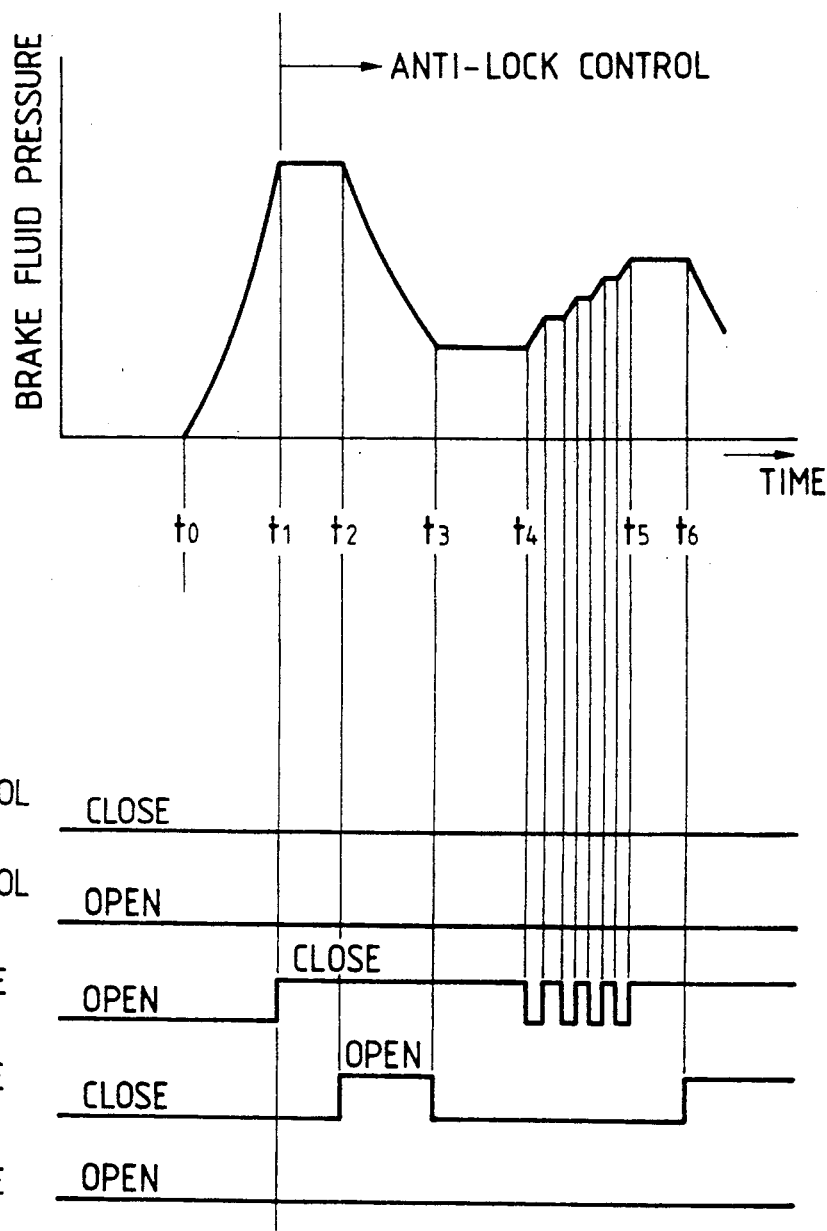
FIG. 15 is a timing chart explaining the anti-lock control operation of the apparatus shown in FIG. 13.

FIG. 15 is a timing chart showing an anti-lock control operation of the hydraulic brake pressure control apparatus according to the fourth embodiment, which timing chart corresponds to FIG. 7 of the first embodiment.

Figure 16:
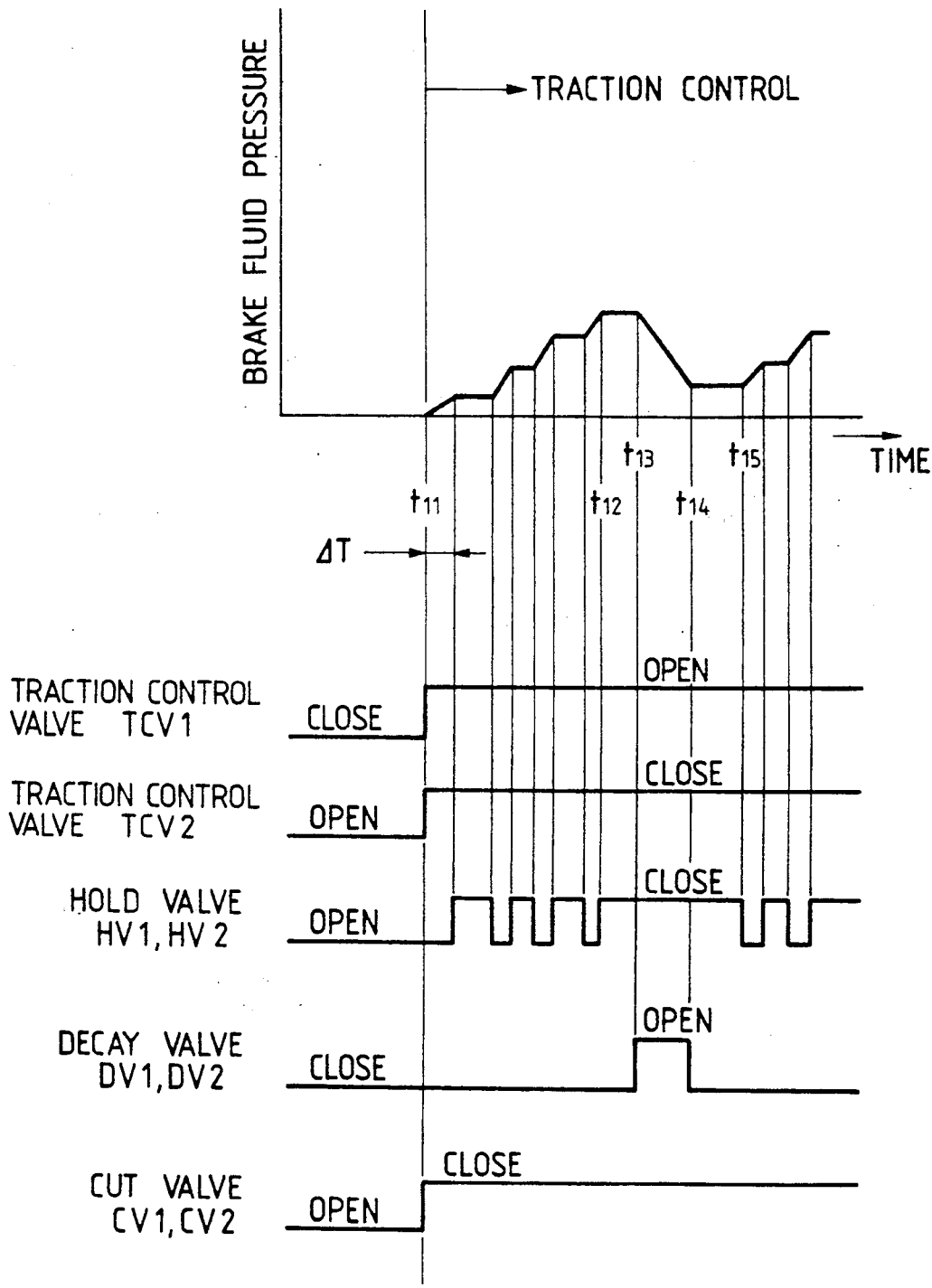
FIG. 16 is a timing chart explaining the traction control operation of the apparatus shown in FIG. 13.

The normal braking operation in the above paragraph (A) is achieved when the traction control valve TCV1 closes while the traction control valve TCV2 opens as shown in FIGS. 15 and 16. The pressure increasing mode ($t_{11}$ to $t_{12}$) during the traction control operation in the above paragraph (C)-(1) is achieved when both the cut valves CV1 AND CV2 close, the traction control valve TCV1 opens and the traction control valve TCV2 closes.

As described above, since the hydraulic brake pressure controlling apparatus of the present invention is provided with the relief valve, no accumulator of a large capacity is necessary. Further, since the relief spring of the relief valve absorbs a shock pressure occurred when the fluid pump ejects the fluid pressure, the vibration of the apparatus can effectively be suppressed. Furthermore, owing to the relief valve, the apparatus can be provided small in size, light in weight, and manufactured with low cost.

Moreover, since ball valve of the relief valve is provided in a flowing direction of the brake fluid during the opening of the valve, a sealability of the relief valve is extremely good. Further, since the relief piston of the relief valve is always in a good balance owing to the relief spring, the fluid pressure in the fluid passage would not decrease during the actuation of the relief valve and, accordingly, the fluid pressure can stably be supplied.

In the apparatus of the invention, since the heads and of the intake valves and do not protrude into the fluid pressure chamber during the normal brake operation but protrude into the chamber merely during the anti-lock and traction control operations to engage with the intake sleeves, the intake valves improve in durability. Further, during the normal brake control operation, the piston is urged by the fluid pressure in the fluid pressure chambers. In this condition, since the fluid pressure also acts to urge the valve seat of the piston against the valve member of the intake valve, a sealability of the valve member during the normal brake control operation is extremely good.

Moreover, since a seal part on the fluid passages from the fluid pressure chambers and a seal part from the fluid pump 23 are composed of the valve members of the intake valves and the valve seat of the piston, the sealability of the invention is obtained reliably.

Moreover, since the intake valves are provided with supporting portions which always contact to inner peripheral walls of the opening part of the valve chamber and the center hole of the piston, respectively, so that the intake valve smoothly slides in the opening part and the center hole without any irregular movement when the intake valve is retracted by the intake sleeve.

Furthermore, in the another aspect of the invention, since the relief piston of the relief valve and the relief spring hold the fluid pressure highest than the highest fluid pressure of the master cylinder and the fluid supply is carried out during the anti-lock or traction control operation by opening the supply valve PWV while the anti-lock valve ALV or the traction control valve TCV closes, the responsibility of the fluid pump at the start of its supply is improved.

What is claimed is:

1. An apparatus for controlling brake fluid pressure of a vehicle having wheels, comprising:
   (a) a master cylinder comprising a housing having at least one fluid pressure chamber therein, and at least one piston movably mounted within said housing so as to control fluid pressure within said fluid pressure chamber, said housing having a valve chamber which opens to said fluid pressure chamber;
   (b) a fluid pressure source for supplying brake fluid;
   (c) a reservoir for holding the brake fluid;
   (d) a wheel cylinder for applying a braking force to the vehicle wheels;
   (e) a first fluid passage communicating said fluid pressure chamber with said wheel cylinder;
   (f) a hold valve provided in said first fluid passage so as to control fluid communication between said fluid pressure chamber and said wheel cylinder;
   (g) a second fluid passage communicating said wheel cylinder with said reservoir;
   (h) a decay valve provided in said second fluid passage so as to control fluid communication between said wheel cylinder and said reservoir;
   (i) a third fluid passage connecting said fluid pressure source to said fluid pressure chamber, said valve chamber being provided in said third fluid passage;
   (j) at least one intake valve mounted in said valve chamber and normally held it a closed position to shut off said third fluid passage;
   (k) a valve operating member mounted on said piston for movement therewith, said valve operating member being engageable with said intake valve when stroke movement of said piston reaches a predetermined value to thereby move said intake valve to an open position; and
   (l) means provided in said third fluid passage for discharging said brake fluid in said third fluid passage to said reservoir, said discharging means being normally held in a closed position but opened upon fluid pressure in said third passage reaching a predetermined pressure.

2. The apparatus of claim 1, wherein there are provided two said pistons spaced from each other in a direction of movement of said pistons, one of said two pistons being a primary piston while the other is a secondary piston, there being provided two said fluid pressure chambers one of which is a first fluid pressure chamber while the other is a second fluid pressure chamber, the fluid pressures within said first and second fluid pressure chambers being controlled by said primary and secondary pistons, respectively, and there being provided two said intake valves received respectively in two said valve chambers spaced from each other in the direction of movement of said primary and secondary pistons.

3. The apparatus of claim 1, wherein said valve chamber having an opening which opens to said fluid pressure chamber, said intake valve being engageable in said opening so as to shut off said third fluid passage.

4. The apparatus of claim 1, wherein said valve operating member is in the form of a sleeve having an outer periphery, said sleeve being movable in a direction of a longitudinal axis thereof and having one end held against said piston, said sleeve having an inclined surface formed at said outer periphery at its other end, said inclined surface being inclined toward a center line of said sleeve, said inclined surface being engageable with one end of said intake valve projecting into said fluid pressure chamber.

5. An apparatus for controlling brake fluid pressure of a vehicle having wheels, comprising:
   (a) a master cylinder comprising a housing having a first fluid pressure chamber and a second fluid pressure chamber therein, a primary piston movably mounted within said housing so as to control fluid pressure within said first fluid pressure chamber, a secondary piston movably mounted within said housing so as to control fluid pressure within said second fluid pressure chamber, said pistons being spaced from each other in a direction of movement of said pistons, said housing having two valve chambers which open respectively to said first and second fluid pressure chambers, said valve chambers being spaced from each other in a direction of movement of said primary and secondary pistons;

(b) a fluid pressure source for supplying brake fluid;

(c) a reservoir for holding the brake fluid;

(d) a wheel cylinder for applying a braking force to the vehicle wheels;

(e) a first fluid passage communicating one of said first and second fluid pressure chambers with said wheel cylinder;

(f) a hold valve provided in said first fluid passage so as to control fluid communication between said one of said first and second fluid pressure chambers and said wheel cylinder;

(g) a second fluid passage communicating said wheel cylinder with said reservoir;

(h) a decay valve provided in said second fluid passage so as to control fluid communication between said wheel cylinder and said reservoir;

(i) a third fluid passage connecting said fluid pressure source to said fluid pressure chambers, said valve chambers being provided in said third fluid passage;

(j) two intake valves received respectively in said two valve chambers and normally held in a closed position to shut off said third fluid passage;

(k) a valve operating member mounted on each of said pistons for movement therewith, said valve operating member being engageable with a respective one of said intake valves when stroke movement of each said piston reaches a predetermined value to thereby move said intake valve to an open position;

(l) means provided in said third fluid passage for discharging said brake fluid in said third fluid passage to said reservoir, said discharging means being normally held in a closed position;

an auxiliary piston mounted around said primary piston and operable to move said primary piston;

an auxiliary fluid pressure chamber provided within said housing, said auxiliary fluid chamber being connected to said fluid pressure source through a fourth fluid passage and also connected to said reservoir through a fifth fluid passage, the brake fluid within said auxiliary fluid pressure chamber acting on said auxiliary piston;

a traction control valve being provided in said fifth fluid passage and being operable to be opened when a slip of the wheels of the vehicle reaches a predetermined level, thereby allowing the brake fluid to flow from said fluid pressure source to said auxiliary fluid chamber so as to increase the fluid pressure within said auxiliary fluid chamber; and a cut-off valve provided in said first fluid passage and being operable to be closed when the slip of the wheels of the vehicle reaches the predetermined level, whereby when the slip of the wheels reaches said predetermined level, said auxiliary piston is moved to move said primary piston, thereby achieving a traction control.

6. An apparatus for controlling brake fluid pressure of a vehicle having wheels, comprising:

(a) a master cylinder comprising a housing having at least one fluid pressure chamber therein, and at least one piston movably mounted within said housing so as to control fluid pressure within said fluid pressure chamber, said housing having a valve chamber which opens to said fluid pressure chamber;

(b) a fluid pressure source for supplying brake fluid;

(c) a reservoir for holding the brake fluid;

(d) a wheel cylinder for applying a braking force to the vehicle wheels;

(e) a first fluid passage communicating said fluid pressure chamber with said wheel cylinder;

(f) a hold valve provided in said first fluid passage so as to control fluid communication between said fluid pressure chamber and said wheel cylinder;

(g) a second fluid passage communicating said wheel cylinder with said reservoir;

(h) a decay valve provide din said second fluid passage so as to control fluid communication between said wheel cylinder and said reservoir;

(i) a third fluid passage connecting said fluid pressure source to said fluid pressure chamber, said valve chamber being provided in said third fluid passage;

(j) at least one intake valve mounted in said valve chamber and normally held in a closed position to shut off said third fluid passage;

(k) a valve operating member mounted on said piston for movement therewith, said valve operating member being engageable with said intake valve when stroke movement of said piston reaches a predetermined value to thereby move said intake valve to an open position; and (l) means provided in said third fluid passage for discharging said brake fluid in said third fluid passage to said reservoir, said discharging means being normally held in a closed position;

said valve chamber having an opening which opens to said fluid pressure chamber, one end of said intake valve being received in said opening, said intake valve having a valve portion, a valve piston mounted within said valve chamber and having a valve seat at one end thereof remote from said opening, said intake valve being movable relative to said valve piston, a first spring having a bias for urging said valve seat into sealing engagement with said valve portion to shut off said third fluid passage, said valve piston being movable together with said intake valve between a first position where said one end of said intake valve is fully received in said opening and a second position where said one end of said intake valve projects into said fluid pressure chamber; said valve piston being normally closed in said first position; said valve piston being moved by the fluid pressure, supplied from said fluid pressure source, to said second position against the bias of said first spring when said fluid pressure in said third fluid passage increases; and in said second position of said valve piston, said valve operating member being engageable with said one end of said intake valve to move said intake valve relative to said valve piston to thereby disengage said valve portion of said intake valve from said valve seat of said valve piston to communicate said fluid pressure source with said fluid pressure chamber through said third passage.

7. The apparatus of claim 6, wherein a second spring is provided for urging said valve portion of said intake valve into sealing engagement with said valve seat of said valve piston.

8. An apparatus for controlling brake fluid pressure of a vehicle having wheels, comprising:
- (a) a master cylinder comprising a housing having at least one fluid pressure chamber therein, and at least one piston movably mounted within said housing so as to control fluid pressure within said fluid pressure chamber, said housing having a valve chamber which opens to said fluid pressure chamber;
- (b) a fluid pressure source for supplying brake fluid;
- (c) a reservoir for holding the brake fluid;
- (d) a wheel cylinder for applying a braking force to the vehicle wheels;
- (e) a first fluid passage communicating said fluid pressure chamber with said wheel cylinder;
- (f) a hold valve provided in said first fluid passage so as to control fluid communication between said fluid pressure chamber and said wheel cylinder;
- (g) a second fluid passage communicating said wheel cylinder with said reservoir;
- (h) a decay valve provided in said second fluid passage so as to control fluid communication between said wheel cylinder and said reservoir;
- (i) a third fluid passage connecting said fluid pressure source to said fluid pressure chamber, said valve chamber being provided in said third fluid passage;
- (j) at least one intake valve mounted in said valve chamber and normally held in a closed position to shut off said third fluid passage;
- (k) a valve operating member mounted on said piston for movement therewith, said valve operating member being engageable with said intake valve when stroke movement of said piston reaches a predetermined value to thereby move said intake valve to an open position; and
- (l) means provided in said third fluid passage for discharging said brake fluid in said third fluid passage to said reservoir, said discharging means being normally held in a closed position;

said discharging means comprising:
- a casing having a first opening communicating with said third fluid passage and a second opening communicating with said reservoir to form a flow of said brake fluid;
- a relief piston accommodated in said casing and movable in a longitudinal direction of said casing;
- a first spring means urging said relief piston;
- a valve means housed in said relief piston;
- a valve operating means for operating said valve means to open when said relief piston moves a predetermined distance against said first spring means; and
- a second spring means for urging said valve means in a direction same as that of said brake fluid flow.

9. The apparatus of claim 8, wherein said first spring means urges said relief piston in a direction opposite to that of said brake fluid flow.

10. The apparatus of claim 8, wherein said first spring means has an elastic force set so that a pressure of said brake fluid when said valve operating means opens said valve means is higher than maximum brake fluid pressure generated in said fluid pressure chamber of said master cylinder.

11. The apparatus of claim 8, wherein said valve is a ball valve and said valve operating means is a valve rod.

12. The apparatus of claim 8, further comprising a motor for driving said fluid pressure source and a switch responsive to the movement of said relief piston for actuating said motor.

13. The apparatus of claim 12, wherein said switch is provided with an actuator operated in accordance with the movement of said relief piston.

14. The apparatus of claim 12, wherein said switch is disposed adjacent to said casing.

15. The apparatus of claim 12, wherein said switch is mounted on said casing.

16. The apparatus of claim 12, wherein said switch consists of a micro-switch.

* * * * *

UNITED STATES PATENT AND TRADEMARK OFFICE
CERTIFICATE OF CORRECTION

PATENT NO. : 5,080,449
DATED : January 14, 1992
INVENTOR(S) : TOSHIFUMI MAEHARA

It is certified that error appears in the above-identified patent and that said Letters Patent is hereby corrected as shown below:

Claim 1, column 16, line 17, change "it" to --in--.

Claim 6, column 18, line 17, change "provide din" to --provided in--.

Signed and Sealed this

Fifteenth Day of June, 1993

Attest:

MICHAEL K. KIRK

Attesting Officer

Acting Commissioner of Patents and Trademarks